United States Patent Office 3,061,163
Patented Oct. 30, 1962

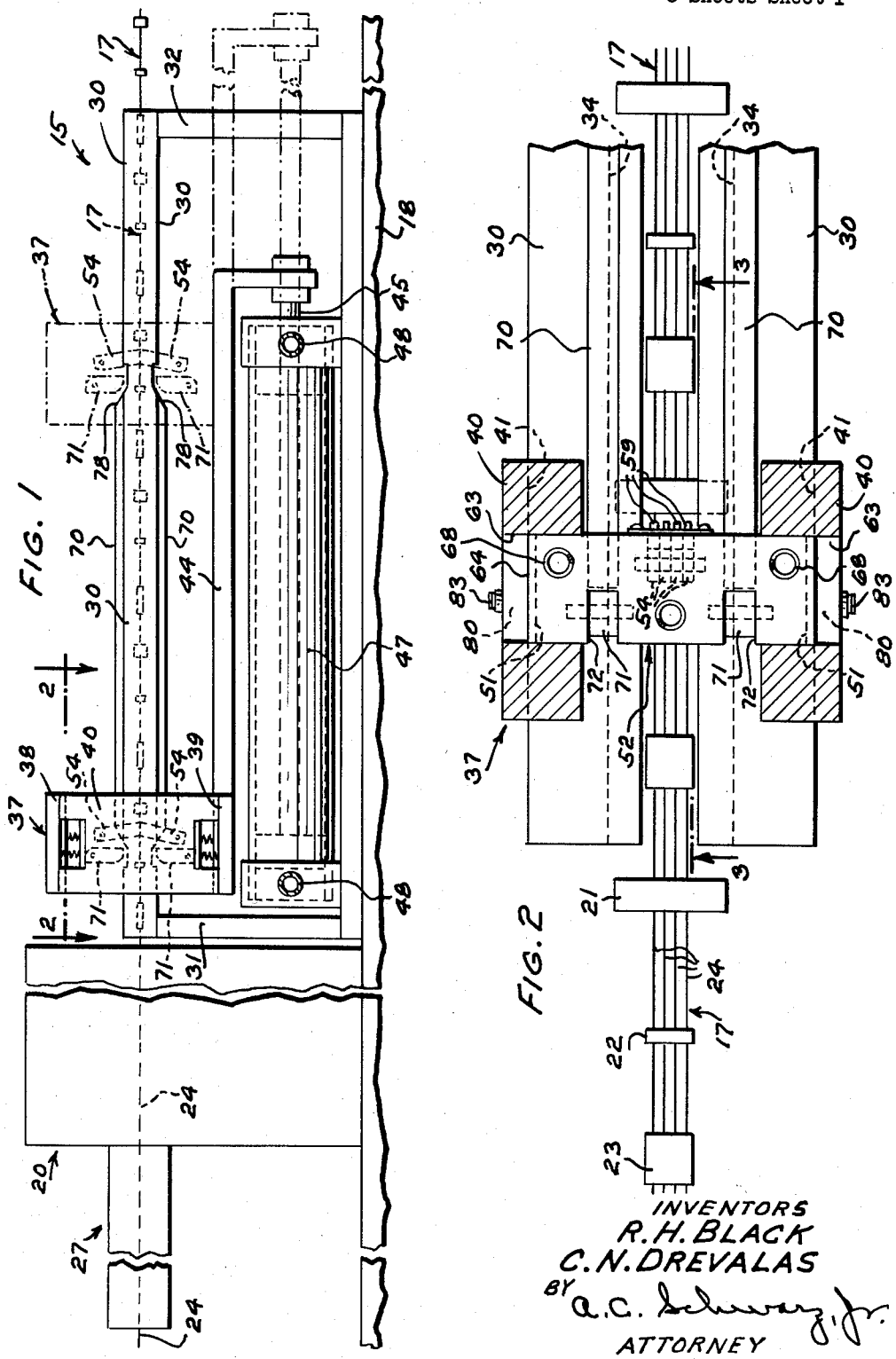

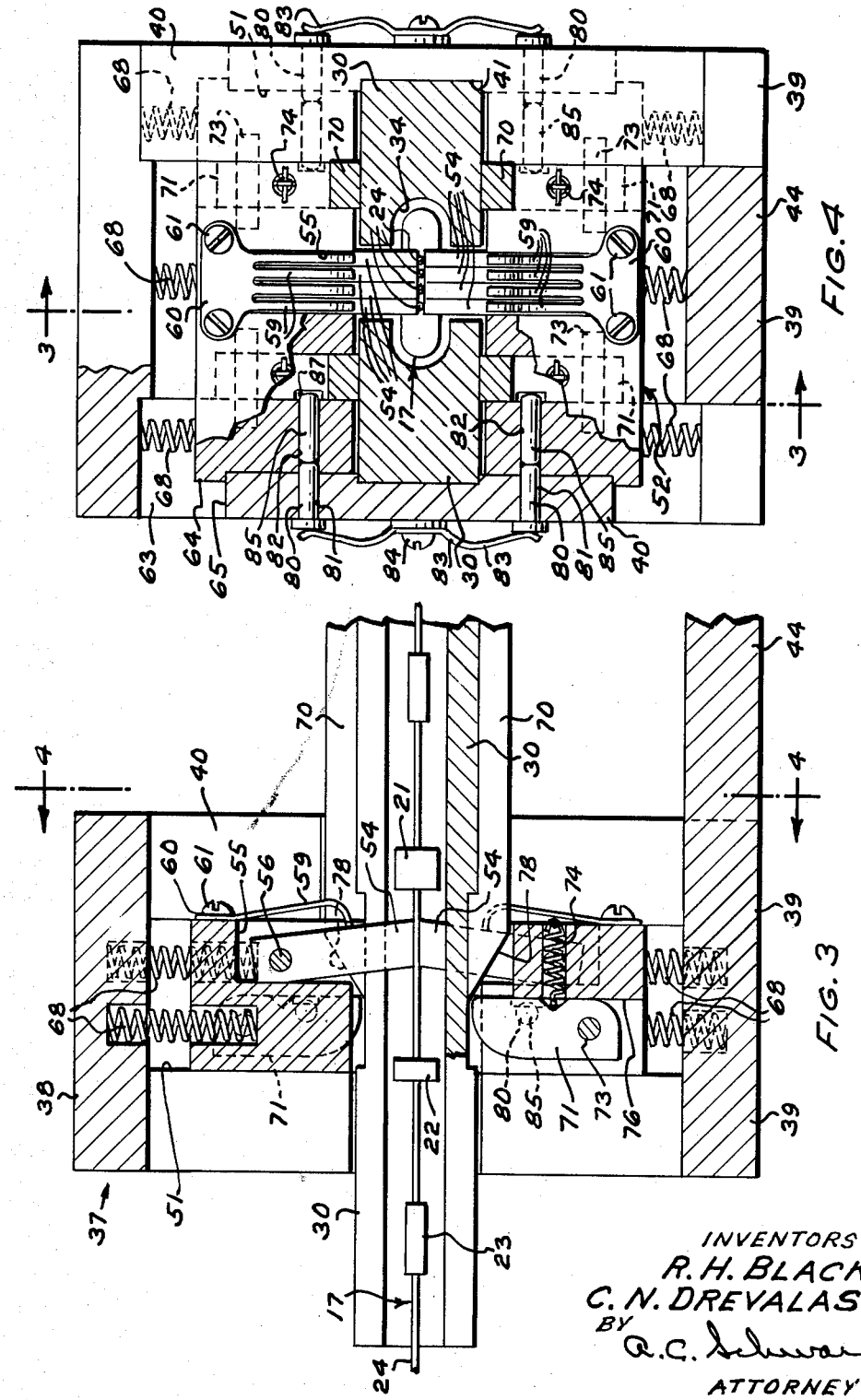

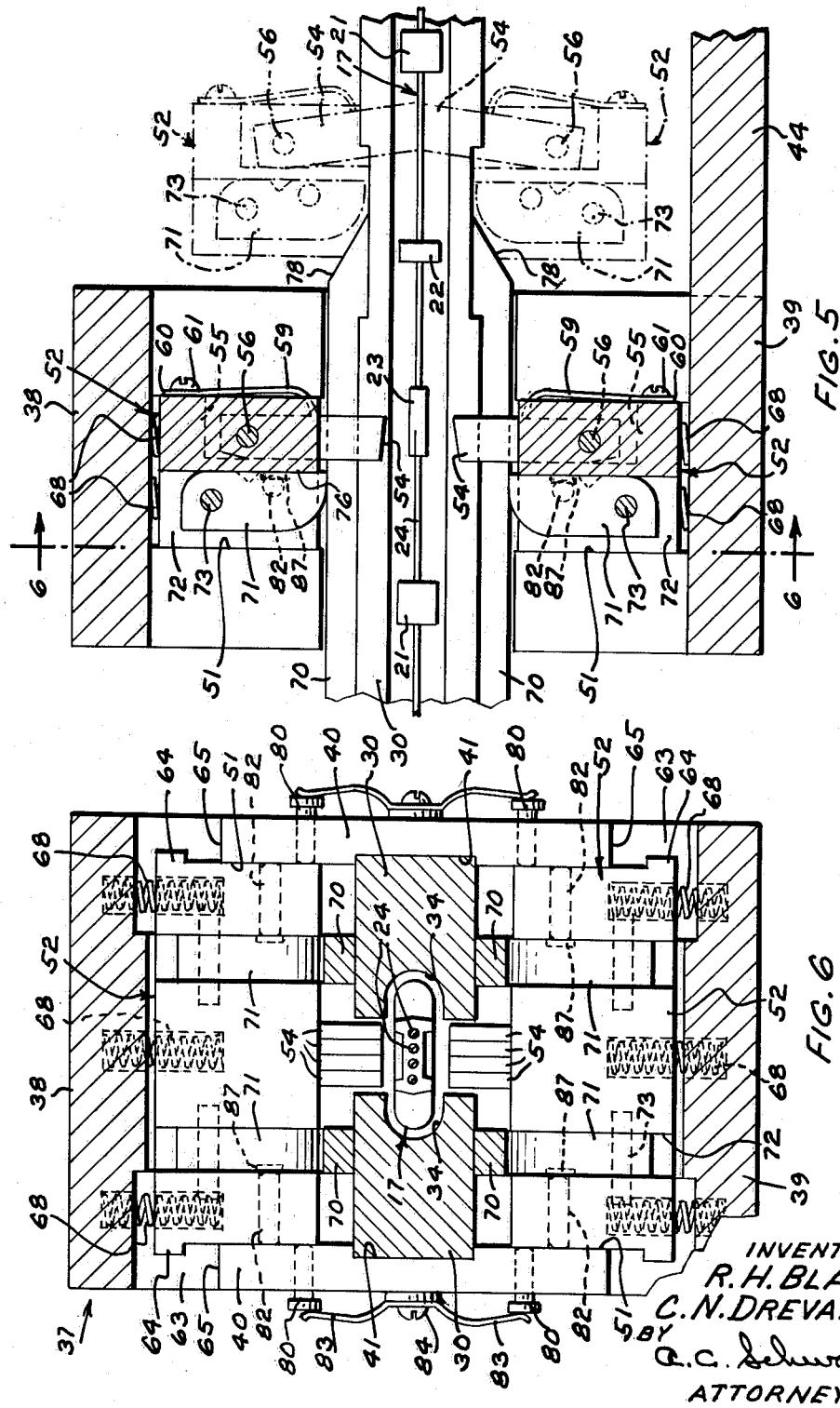

1

3,061,163
APPARATUS FOR ADVANCING AN IRREGULAR ARTICLE OF INDEFINITE LENGTH
Robert H. Black, Wonder Lake, and Constantine N. Drevalas, Wheaton, Ill., assignors to Western Electric Company, Incorporated, New York, N.Y., a corporation of New York
Filed June 16, 1961, Ser. No. 117,714
4 Claims. (Cl. 226—167)

This invention relates to an apparatus for advancing an article of irregular shape and indefinite length, and more particularly to an apparatus for intermittently advancing parallel wires of indefinite length having longitudinal spaced members molded thereon.

An object of the present invention is to provide an apparatus for advancing an irregular article of indefinite length.

Another object of the invention is to provide an apparatus for intermittently advancing parallel wires of indefinite length having spaced members molded thereon.

With these and other objects in view, the invention contemplates the provision of a pair of parallel rails mounted adjacent a machine for molding blocks in longitudinally spaced relation to one another onto a plurality of parallel wires to form an elongated composite article. The rails are disposed in laterally spaced relation to each other for receiving the composite article therebetween and have a carriage slidably supported thereon for reciprocatory movement. Wire gripping jaws disposed above and below the wires of the composite article are pivotally mounted in a pair of holders which are mounted on the carriage for vertical movement relative thereto and are spring urged to operative positions with the jaws in gripping engagement with the wires. The carriage is actuated to advance the composite article through a predetermined distance to remove a portion of the composite article from the molding machine and to advance another portion of the wires thereinto.

During the return movement of the carriage actuating pawls pivotally mounted on the holders ride onto cam tracks on the rails and move the holders vertically to retracted positions with the gripping jaws in spaced relation to the wires and to the molded members thereon. At the end of the return stroke of the carriage, the holders ride off of the cam tracks to effect the vertical movement of the holders to their operative positions with the jaws in gripping engagement with the wires of the composite article.

Other objects, advantages and novel aspects of the invention will become apparent upon consideration of the following detailed description, in conjunction with the accompanying drawings, in which:

FIG. 1 is a fragmentary side elevational view of an apparatus for advancing an elongated article intermittently through a machine for molding members thereonto;

FIG. 2 is an enlarged fragmentary plan sectional view of the apparatus showing a portion of the elongated composite article being advanced thereby taken on line 2—2 of FIG. 1;

FIG. 3 is an enlarged fragmentary vertical longitudinal sectional view of the apparatus taken on the lines 3—3 of FIGS. 2 and 4 and showing the article moving carriage in its retracted position and showing the article gripping jaws in operative position in gripping engagement with the article;

FIG. 4 is an enlarged vertical cross-sectional view of the apparatus taken on the line 4—4 of FIG. 3 with portions of the apparatus broken away;

FIG. 5 is a fragmentary longitudinal vertical sectional view of the apparatus showing in dotted lines a portion of the article advancing mechanism in advanced position and

2 showing the carriage in full lines in an intermediate position during the initial portion of its return movement and showing the article gripping jaws in their retracted position in spaced relation to the article; and FIG. 6 is a longitudinal cross-sectional view of the apparatus taken on line 6—6 of FIG. 5.

Referring to the drawings, particularly FIGS. 1 and 2, the present apparatus 15 for intermittently advancing a composite article 17 of indefinite length is supported on a horizontal frame plate 18 adjacent to a molding machine 20 for molding members 21, 22 and 23 in longitudinally spaced relation to each other onto a plurality of laterally spaced parallel wires 24 to form the composite article 17. The wires 24 are drawn from supplies thereof through a wire straightening device 27 and are straightened thereby before entering the molding machine 20.

The article advancing apparatus 15 comprises a pair of horizontally disposed rails 30 supported in laterally spaced relation to each other by a pair of vertical frame members 31 and 32 on the horizontal frame plate 18. As shown in FIGS. 2, 4 and 6, the laterally spaced rails 30 are provided with opposed grooves 34 (FIGS. 4 and 6) to provide clearance for the longitudinal movement of the composite article 17 therebetween.

Mounted slidably on the supporting rails 30 is an article advancing carriage 37 comprising a pair of horizontal upper and lower plates 38 and 39 secured to a pair of vertical side plates 40, 40. The side plates 40 are provided with horizontally disposed guideways 41 for receiving the rails 30 therein. The lower plate 39 of the carriage 37 is connected to one end of a link 44, the other end of which is connected to a rod 45 of a piston reciprocable within a cylinder of a fluid-operated actuator 47 for reciprocating the carriage through a predetermined distance. The actuator 47 is fixedly mounted on the horizontal frame plate 18 and the piston thereof is reciprocated by compressed air admitted to opposite ends thereof through conduits 48 under control of a valve, not shown.

The vertical side walls 40 of the carriage 37 are also provided with opposed vertically disposed guideways 51 for receiving the end portions of carriers or holders 52 in the form of blocks for vertical movement therein. Mounted on each of the carriers 52 for vertical movement therewith are wire gripping jaws 54, one for each of the wires 24 of the composite article 17. The jaws which fit in side-by-side relation to each other within a recess 55 in the carrier are supported on pins 56 for limited pivotal movement and have serrated or roughened end surfaces 57 to provide effective gripping connections with the wires. Spring fingers 59 of a leaf spring 60 secured by screws 61 to the carriers stress the jaws for pivotal movement into gripping engagement with the wires 24.

Slots 63 (FIGS. 4 and 6) formed in the upper and lower end portions of the side plates 40 provide clearance for stop lugs 64 which extend laterally from the carriers 52 and which are engageable with the stop surfaces 65 on the side plates 40 for locating the carriers 52 in operative positions adjacent to the rails 30 and with the jaws 54 in gripping engagement with the wires 24 of the composite article 17. The carriers 52 are urged to and yieldably maintained in operative positions by a plurality of springs 68 that are interposed between the blocks 52 and the horizontal plates 38 and 39 of the carriage 37 and seat in suitable recesses therein.

With the carriers 52 in their operative positions and with the jaws 54 in gripping engagement with the wires 24 of the composite article 17, the carriage 37 may be advanced by the actuator 47 to effect the advancing movement of the article through a predetermined distance to remove from the molding apparatus 20 a portion of the wires 24 having sets of newly molded blocks 21, 22 and 23 thereon and to advance the following portions of the wires into the molding apparatus preparatory to the next molding operation.

Mechanism is provided for actuating the carriers 52 vertically to retracted positions with the two sets of gripping jaws spaced from each other and from the wires 24 and the blocks 21, 22 and 23 thereon, and to maintain them in such retracted condition during the return movement of the carriage 37 to its original starting position. For this purpose, horizontal cam tracks 70 are provided on the upper and lower sides of each of the rails 30 for cooperation with actuating elements 71 mounted on the carriers 52. The actuating elements 71 are in the form of pawls fitting in slots 72 in the carrier block and supported for pivotal movement on pins 73 on the carrier blocks. Contractile springs 74 disposed in apertures in the carrier 52 stress the actuating elements 71 to normal vertical positions with one side of each of the elements in engagement with a vertical surface 76 of the slots 72 in the carriers 52.

The arrangement of the actuating elements 71 and the cam tracks 70 is such that at the end of the forward and the rearward strokes of the carriage 37, the actuating elements 71 are disposed in their normal vertical positions in spaced and close proximity to sloping end surfaces 78 of the cam tracks 70. In response to the forward movement of the carriage 37, the actuating elements 71 are oscillated about their pivot pins 73 by the cam tracks 70 and rest obliquely thereon. As the carriage 37 approaches the end of its advance stroke, the actuating elements 71 ride off of the sloping end portions 78 of the cam tracks 70 and are spring returned to their normal vertical positions as indicated in dotted lines in FIG. 5.

During the initial portion of the return stroke of the carriage 37, the actuating elements 71 are maintained in their vertical positions and ride up onto the cam tracks 70 to effect the vertical shifting of the carriers 52 and the gripping jaws 54 to their retracted positions in which positions they remain during the major portion of the return stroke of the carriage 37. As the carriage 37 approaches the end of its return stroke, the actuating elements ride down the inclined end portions 78 of the cam tracks under the influence of the springs 68 on the carriers 52 thereby effecting the return movement of the carriers 52 to their operative positions and the engagement of the gripping jaws 54 with the wires 24 of the composite article 17 at predetermined points between selected ones of the molded blocks 21, 22 and 23.

To insure that the gripping jaws 54 remain in gripping engagement with the wires 24 of the composite article during the advancing movement of the carriage 37, mechanism is provided for locking the carrier blocks 52 in their operative positions. This mechanism includes headed pins 80 (FIGS. 4 and 6) slidable in apertures 81 in the side walls 40 of the carriage 37 with the end portions of the pins 80 slidable into apertures 82 in carriers 52 when the carriers are in their operative positions. The apertures 82 extend from the end of the carriers 52 to the slots 72 therein in alignment with the elements 71. Leaf springs 83 secured to the carriers by screws 84 urge the pins 80 into the apertures 82 to lock the carriers 52 against vertical movement.

Release pins 85 of a length equal to the length of the apertures 82 are slidably mounted in the apertures 82 in the carriers 52 in engagement with the locking pins 80. When the carriers 52 are in their operative positions and during the initial portion of the advance movement of the carriage 37, as the actuating elements 71 are moved by the cam tracks 70 from their normal vertical positions to oblique positions, clearance is provided thereby for forward movement of the release pins 85 into the slots 72, whereupon the springs 83 act to move the locking pins 80 into the apertures 82 of the carriers 52 to lock the carriers in operative positions.

This inward movement of the locking pin 80 advances the release pin 85 so that the end portion thereof projects into the recesses 72 in the carrier block in the path of movement of the actuating element 71. Sloping cam surfaces 87 are provided on the actuating elements 71 so that on completion of the advancing movement of the carriage 37, the actuating elements 71 will be returned to their normal vertical positions by the spring 74 and effect the return movements of the release pins 83 and of the locking pins 80 to unlock the carriers 52. In the event the springs 74 are not strong enough to effect the return movement of the actuating elements 71 to their normal vertical positions at the end of a forward stroke of the carriage 37, this movement of the actuating elements to vertical positions will be effected during the initial return movement of the carriage 37 by the engagement of the actuating elements with the sloping ends 78 of the cam tracks 70.

It is to be understood that the above-described arrangements are simply illustrative of the application of the principles of this invention. Numerous other arrangements may be readily devised by those skilled in the art which will embody the principles of the invention and fall within the spirit and scope thereof.

What is claimed is:

1. In an apparatus for intermittently advancing an irregular article of indefinite length, a rail, a carriage supported for movement on said rail, means for imparting forward and return movements to said carriage, a pair of holders mounted on said carriage on opposite sides of the article for movement with said carriage and for movement relative thereto and to each other transversely of said rail, jaws mounted on said holders in opposed relation to each other for gripping the article therebetween, resilient means on said carriage for urging said holders to operative positions with the jaws in gripping engagement with the article, cam tracks mounted on said rail having straight intermediate surfaces in parallel relation to each other and having sloping surfaces at each end thereof, actuating elements cooperable with said cam tracks, means pivotally mounting said actuating elements on said holders for movement therewith and for pivotal movement relative thereto to and from first positions disposed perpendicular to the intermediate surfaces of said cam tracks, and resilient means for urging said actuating elements to said first positions, the arrangement being such that the carriage is advanced a distance greater than the length of said cam tracks so that in response to forward movement of said carriage said actuating elements are pivoted to oblique positions by said tracks and are restored to said first positions at the end of the forward movement, and in response to return movement of said carriage said actuating elements ride onto the sloping and the straight surfaces of said cam tracks to effect the movement of said holders to retracted positions on said carriage with said jaws spaced from the article.

2. In an apparatus for intermittently advancing an irregular article of indefinite length, a rail, a carriage supported for movement along said rail, a pair of holders mounted on said carriage on opposite sides of the article for movement with said carriage and and for movement relative thereto and to each other transversely of said rail, jaws mounted on said holders in opposed relation to each other for gripping the article therebetween, resilient means on said carriage for urging said holders to operative positions with the jaws in gripping engagement with the article, cam tracks mounted on said rails having straight intermediate surfaces and sloping end surfaces, actuating elements cooperable with said cam tracks, means pivotally mounting said actuating elements on said holders for movement therewith and for pivotal movement relative thereto to and from normal positions disposed perpendicular to the intermediate surfaces of said cam tracks, resilient means for urging said actuating elements to said normal positions, means for imparting forward and return movements to said carriage through a distance greater than the length of said cam tracks, the arrangement being such that in response to forward movement of the carriage the actuating elements engage the cam tracks and are pivoted to oblique positions and are restored to normal positions at the end of the forward movement and in response to return movement of the carriage the actuating elements ride up onto the cam tracks to effect the movement of the holders to retracted positions on said carriage with the gripping jaws in spaced relation to the article, means operable in response to forward movement of the carriage and the pivotal movement of the actuating elements to oblique positions for locking said holders in operative positions, and means for rendering said locking means ineffective during the return movement of said carriage.

3. In an apparatus for intermittently advancing an irregular article of indefinite length, a pair of rails mounted in parallel and laterally spaced relation to each other for movement of the article therebetween, a carriage supported for movement along said rails, a pair of holders mounted on said carriage on opposite sides of the article for movement with said carriage and for movement relative thereto transversely of said rails, jaws mounted on said holders in opposed relation to each other for gripping the article therebetween, resilient means on said carriage for urging said holders toward each other and the article to operative positions with said jaws in gripping engagement with the article, cam tracks mounted on said rails and having straight intermediate surfaces parallel to each other and having sloping end surfaces, actuating elements pivotally mounted on said holders for limited pivotal movement in one direction from first positions substantially perpendicular to said rails and in alignment therewith, spring means on said holders for urging said actuating elements to said first positions, and means for imparting forward and reverse movements to said carriage along said rails through a distance greater than the length of said cam tracks to effect the movement of said actuating elements along the entire length of said cam tracks and beyond said sloping end surfaces thereof, the arrangement being such that in response to forward movement of said carriage, said actuating elements are engaged and pivoted to oblique positions by said cam tracks, and in response to return movement of said carriage said actuating elements are disposed in said first positions and ride onto said cam tracks to effect the movement of said holders to retracted positions on said carriage to support said gripping jaws in spaced relation to the article.

4. In an apparatus for intermittently advancing an article along a predetermined path wherein the article is of indefinite length and has longitudinally spaced lateral projections thereon, a carriage, means for supporting said carriage for movement along said path, a pair of holders mounted on said carriage for movement therewith along said path on opposite sides of the article and for movement relative to said carriage and to each other transversely of said path, jaws pivotally mounted on said holders and engageable with the article therebetween for establishing a releasable connection therewith, resilient means on said carriage for moving said holders toward each other and the article to operative positions with the jaws in engagement with the article and with the jaws operable to advance the article in response to forward movement of said carriage and to release the article in response to reverse movement of the carriage, means for imparting advance and return movements to said carriage to effect the intermittent advancement of the article, means for locking the holders in operative positions during the advance movement of the carriage, actuating elements pivotally mounted on said holders, and cam tracks mounted on said supporting means parallel to said path for moving said actuating elements and said holders to retracted positions with said jaws in laterally spaced relation to the article and to the projections thereon and for maintaining said elements and said holders in the retracted position during the return movement of said carriage.

References Cited in the file of this patent

UNITED STATES PATENTS

| | | |
|---|---|---|
| 1,776,260 | Johnson | Sept. 23, 1930 |
| 2,603,854 | Gavurin | July 22, 1952 |
| 2,652,877 | Travis | Sept. 22, 1953 |
| 2,808,147 | Moeltzner | Oct. 1, 1957 |
| 2,995,159 | Berggren | Aug. 8, 1961 |